United States Patent
Kang et al.

(10) Patent No.: US 10,728,457 B2
(45) Date of Patent: *Jul. 28, 2020

(54) METHOD AND APPARATUS FOR OPERATING SENSOR OF ELECTRONIC DEVICE

(71) Applicant: Samsung Electronics Co., Ltd., Gyeonggi-do (KR)

(72) Inventors: Seung-Goo Kang, Seoul (KR); Hyun-Woo Sim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,149

(22) Filed: Aug. 12, 2019

(65) Prior Publication Data

US 2019/0364214 A1 Nov. 28, 2019

Related U.S. Application Data

(63) Continuation of application No. 15/373,200, filed on Dec. 8, 2016, now Pat. No. 10,382,686.

(30) Foreign Application Priority Data

Jan. 8, 2016 (KR) .................. 10-2016-0002908

(51) Int. Cl.
*H04N 5/228* (2006.01)
*H04N 5/232* (2006.01)
(Continued)

(52) U.S. Cl.
CPC ....... *H04N 5/23287* (2013.01); *H04N 5/2258* (2013.01); *H04N 5/23245* (2013.01);
(Continued)

(58) Field of Classification Search
None
See application file for complete search history.

(56) References Cited

U.S. PATENT DOCUMENTS

| | | |
|---|---|---|
| 9,232,138 B1 | 1/2016 | Baldwin |
| 2010/0039515 A1 | 2/2010 | Dietz |
| 2011/0141297 A1 | 6/2011 | Orimoto et al. |

(Continued)

FOREIGN PATENT DOCUMENTS

| | | |
|---|---|---|
| CN | 103227892 | 7/2013 |
| CN | 104246432 | 12/2014 |

(Continued)

OTHER PUBLICATIONS

Chinese Office Action dated Jan. 6, 2020 issued in counterpart application No. 201680077794.9, 23 pages.

(Continued)

*Primary Examiner* — Stephen P Coleman
(74) *Attorney, Agent, or Firm* — The Farrell Law Firm, P.C.

(57) ABSTRACT

The present disclosure provides an electronic device. The electronic device includes at least two camera modules, a motion sensor, and a control circuit configured to determine whether a first camera module of the at least two camera modules is activated, and when it is determined that the first camera module of the at least two camera modules is activated, control optical image stabilization of the first camera module using a signal received from the motion sensor.

20 Claims, 15 Drawing Sheets

(51) Int. Cl.
*H04N 5/225* (2006.01)
*H04N 5/247* (2006.01)

(52) U.S. Cl.
CPC ......... *H04N 5/23258* (2013.01); *H04N 5/247* (2013.01); *H04N 5/2252* (2013.01)

(56) References Cited

U.S. PATENT DOCUMENTS

| | | |
|---|---|---|
| 2013/0188071 A1 | 7/2013 | Fujita |
| 2014/0089243 A1* | 3/2014 | Oppenheimer ......... G06F 21/50 706/46 |
| 2015/0077579 A1 | 3/2015 | Uemura et al. |
| 2015/0130954 A1 | 5/2015 | Hyun |
| 2015/0132738 A1 | 5/2015 | Li |
| 2016/0123758 A1 | 5/2016 | Benzaia |
| 2016/0142634 A1 | 5/2016 | You et al. |
| 2016/0316150 A1* | 10/2016 | Eromaki ................ H04N 5/247 |

FOREIGN PATENT DOCUMENTS

| | | |
|---|---|---|
| CN | 104253940 | 12/2014 |
| EP | 1 936 956 | 8/2012 |
| JP | 10-254006 | 9/1998 |
| JP | 2011-254212 | 12/2011 |
| JP | 2014-202771 | 10/2014 |
| KR | 10-0758632 | 9/2007 |
| KR | 1020120093601 | 8/2012 |
| WO | WO 2014/207298 | 12/2014 |

OTHER PUBLICATIONS

International Search Report dated Feb. 17, 2017 issued in counterpart application No. PCT/KR2016/013359, 10 pages.
European Search Report dated Aug. 1, 2018 issued in counterpart application No. 16883985.0-1209, 12 pages.

* cited by examiner

METHOD AND APPARATUS FOR OPERATING SENSOR OF ELECTRONIC DEVICE

PRIORITY

This application is a Continuation Application of U.S. patent application Ser. No. 15/373,200, filed on Dec. 8, 2016, in the U.S. Patent and Trademark Office, and claims priority under 35 U.S.C. § 119(a) to Korean Patent Application Serial No. 10-2016-0002908, which was filed in the Korean Intellectual Property Office on Jan. 8, 2016, the entire disclosures of which are incorporated herein by reference.

BACKGROUND

1. Field of the Disclosure

The present disclosure relates generally to an electronic device, and more particularly, to a method and apparatus for operating a sensor in an electronic device.

2. Description of the Related Art

Recent portable terminals require high-capability, high-performance camera modules, and development of digital single-lens reflex (DSLR)-class, multifunctional camera modules is continuing growing. A diversity of functions offered by conventional camera modules equipped in portable terminals can include antishake, such as ones provided by an optical image stabilizer (OIS).

Antishake is technology that compensates for image blur caused by the user's hand movement or body vibration while an image is being captured. Antishake is enabled by detecting a vibration of an electronic device, e.g., camera, through multiple gyro sensors equipped in the electronic device and moving a lens or an image sensor according to the angular velocity and direction of the detected vibration.

Conventional electronic device can be equipped with gyro sensors (or other various sensors) for motion recognition, and can have camera modules that are provided on a front and back surface of the electronic device.

Application of such antishake functionality to the camera module of an electronic device, however, typically requires that the electronic device be equipped with a separate gyro sensor, in addition to the one provided for motion recognition. That is, an electronic device needs a gyro sensor for motion sensing that has the full scale range (FSR) set to 1000 degree per second (dps) to 2000 dps and another gyro sensor for antishake that has the FSR set to 100 dps to 150 dps.

It may prove difficult, however, to provide two gyro sensors, one for each of the front and back camera modules, due to spatial constraints of conventional electronic devices.

SUMMARY

According to an aspect of the present disclosure, there is provided a sensor operation method and apparatus for an electronic device, which is capable of reducing space for installing various parts of the electronic device and material costs by allowing one or more sensors adopted for a particular function of the electronic device to be shared.

In accordance with an aspect of the present disclosure, there is provided an electronic device. The electronic device includes a first camera module and a second camera module, a motion sensor, and a control circuit configured to determine whether a first camera module is activated, and when it is determined that the first camera module is activated, control optical image stabilization of the first camera module using a signal received from the motion sensor.

In accordance with an aspect of the present disclosure, there is provided an electronic device. The electronic device includes a housing, a first camera module exposed through a first portion of the housing and including a first optical image stabilizer, a second camera module exposed through a second portion of the housing and including a second optical image stabilizer, a sensor included in the housing and sensing a motion of at least a portion of the electronic device, and a control circuit electrically connected with the first optical image stabilizer and the second optical image stabilizer and configured to, in response to receiving a signal from the sensor indicating a motion, provide a signal to both or a selected one of the first optical image stabilizer and the second optical image stabilizer.

In accordance with an aspect of the present disclosure, there is provided a method for operating an electronic device. The method includes determining whether a first camera module of the at least two camera modules is activated, and when it is determined that the first camera module of the at least two camera modules is activated, controlling optical image stabilization of the first camera module using a signal received from the motion sensor.

In accordance with an aspect of the present disclosure, there is provided a non-transitory computer-recording medium run by at least one processor and retaining computer readable commands, wherein the commands are configured to determine whether a first camera module of at least two camera modules is activated, and when it is determined that the first camera module of the at least two camera modules is activated, control optical image stabilization of the first camera module using a signal received from the motion sensor.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
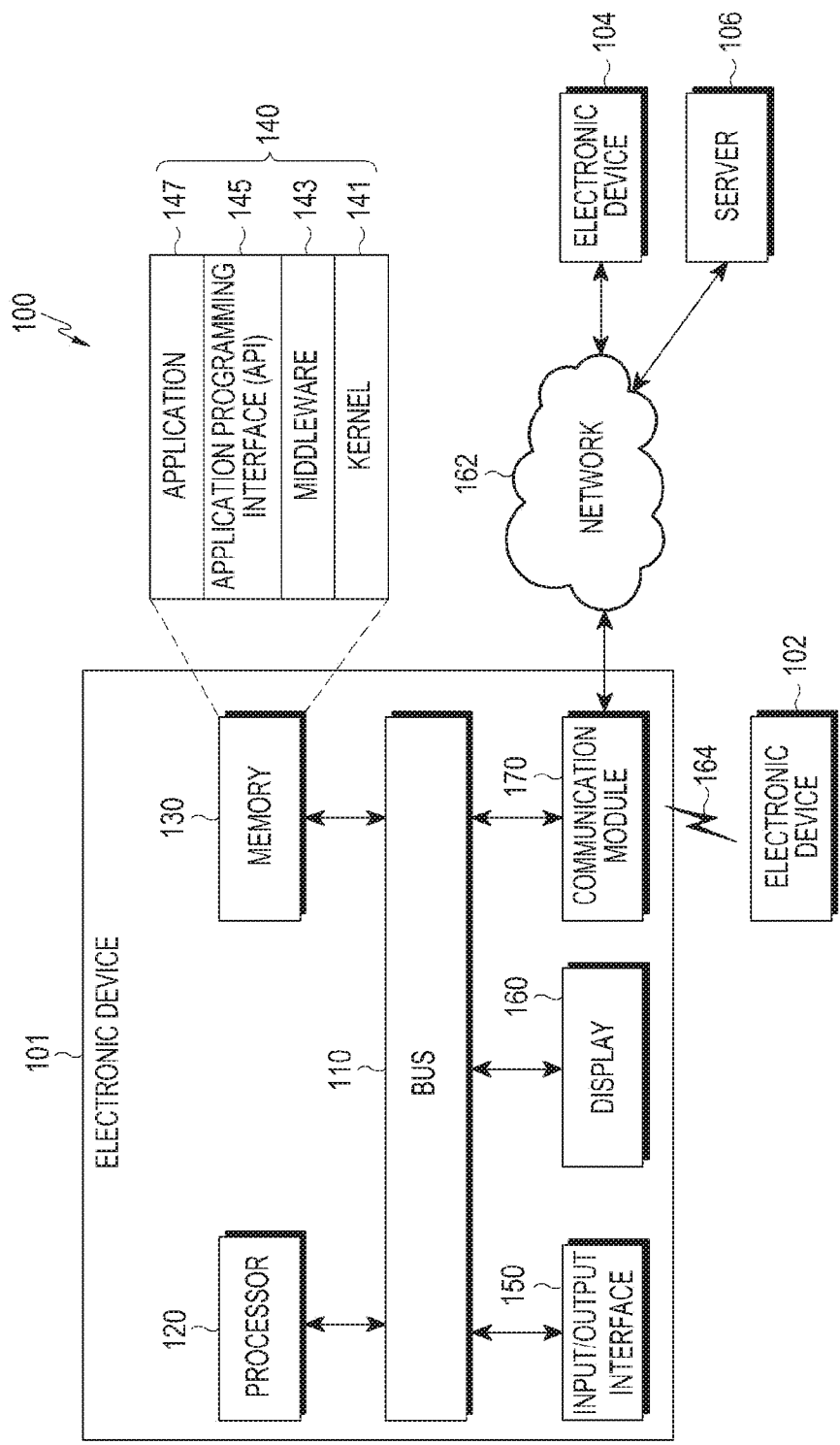
FIG. 1 is a block diagram illustrating an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. A "module" may be a minimum unit of an integrated component or a part thereof. A "module" may be a minimum unit performing one or more functions or a part thereof. A "module" may be mechanically or electronically implemented. For example, a "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may also be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a block diagram illustrating an electronic device 101 in a network environment 100, according to an embodiment of the present disclosure.

Referring to FIG. 1, the electronic device 101 includes a bus 110, a processor 120, a memory 130, an input/output interface 150, a display 160, and a communication interface 170. The electronic device 101 may exclude at least one of the components or may add another component.

The bus 110 may include a circuit for connecting the components with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. The memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of wireless-fidelity (Wi-Fi), Bluetooth (BT), near-field communication (NFC), or global navigation satellite system (GNSS). The GNSS may include at least one of, e.g., global positioning system (GPS), global navigation satellite system (Glonass), Beidou navigation satellite system ("Beidou") or Galileo, or the European global satellite-based navigation system. The terms "GPS" and the "GNSS" may be interchangeably used herein. The wired connection may include at least one of universal serial bus (USB), high definition multimedia interface (HDMI), recommended standard 232 (RS-232), or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. The server 106 may include a group of one or more servers. All or some of operations executed on the electronic device 101 may be executed on the electronic devices 102 and 104 or server 106. When the electronic device 101 performs some function or service automatically or at a request, the electronic device 101, instead of executing the function or service on its own or additionally, may request the electronic devices 102 and 104 or server 106 to perform at least some functions associated therewith. The electronic devices 102 and 104 or server 106 may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
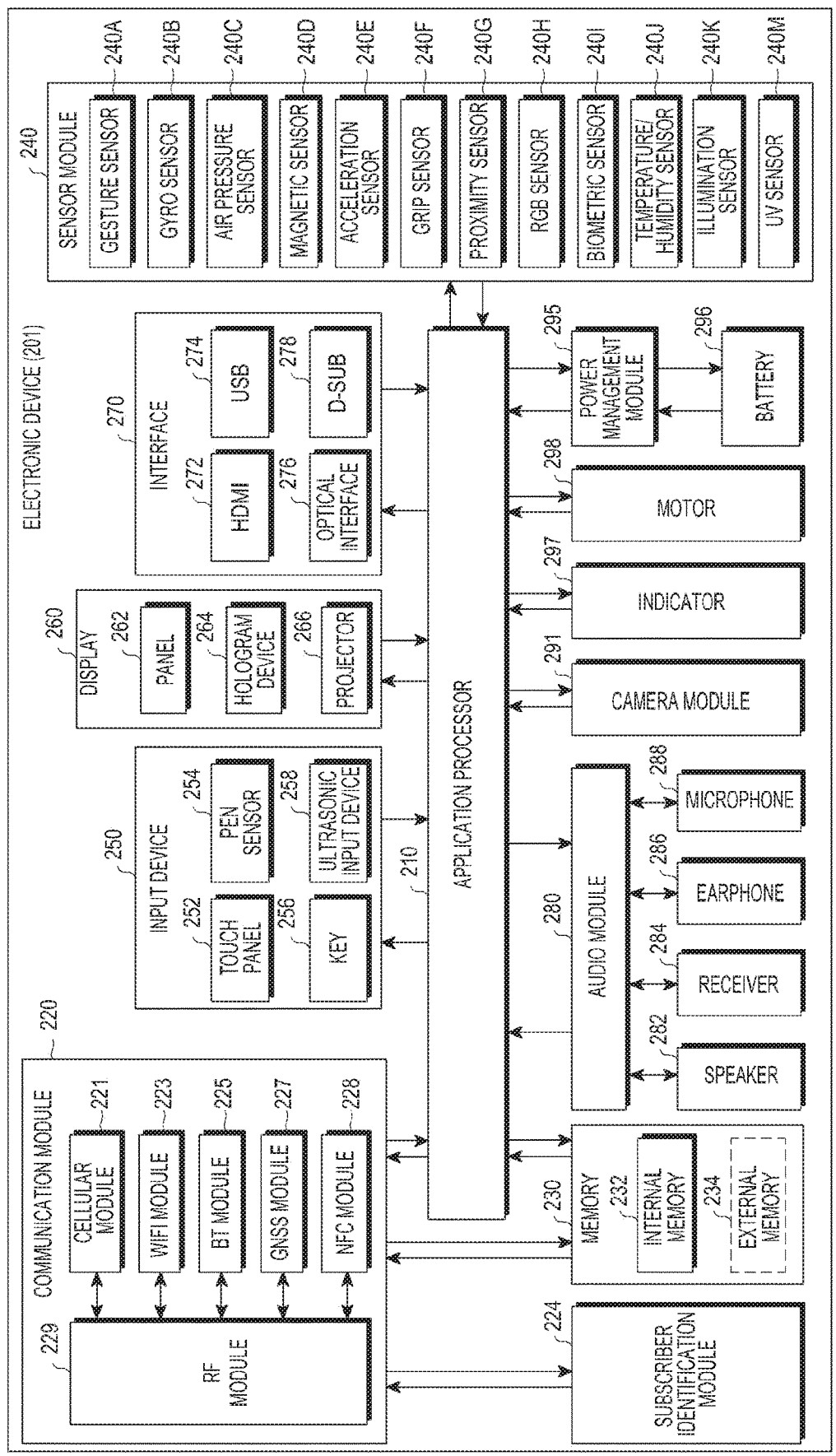
FIG. 2 is a block diagram illustrating an electronic device, according to an embodiment of the present disclosure.

FIG. 2 is a block diagram illustrating an electronic device, according to an embodiment of the present disclosure.

The electronic device 201 includes one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). The processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 includes a cellular module 221, a Wi-Fi module 223, a BT module 225, a GNSS module 227, an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using the SIM 224. The cellular module 221 may perform at least some of the functions providable by the processor 210. The cellular module 221 may include a communication processor (CP).

The Wi-Fi module 223, the BT module 225, the GNSS module 227, or the NFC module 228 may include a process for, e.g., processing data communicated through the module. At least some (e.g., two or more) of the cellular module 221, the Wi-Fi module 223, the BT module 225, the GNSS module 227, or the NFC module 228 may be included in a single integrated circuit (IC) or an IC package.

The RF module 229 may communicate data, e.g., RF signals. The RF module 229 may include, e.g., a transceiver, a power amp module (PAM), a frequency filter, a low noise amplifier (LNA), or an antenna. At least one of the cellular module 221, the Wi-Fi module 223, the BT module 225, the GNSS module 227, or the NFC module 228 may communicate RF signals through a separate RF module.

The SIM 224 may be an embedded SIM, and may contain unique identification information (e.g., an integrated circuit card identifier (ICCID) or subscriber information (e.g., an international mobile subscriber identity (IMSI)).

The memory 230 includes an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, or a memory stick. The external memory 234 may be functionally and/or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, and an ultra violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. The electronic device 201 may further include a processor configured to control the sensor module 240 as part of an AP 210 or separately from the AP 210, and the electronic device 931 may control the sensor module 240 while the AP is in a sleep mode.

The input unit 250 includes a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may use an input tool that generates an ultrasonic signal and enable the electronic device 201 to identify data by sensing the ultrasonic signal to a microphone 288.

The display 260 includes a panel 262, a hologram device 264, and a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. The display 260 may further include a control circuit to control the panel 262, the hologram device 264, or the projector 266.

The interface 270 includes an HDMI 272, a USB 274, an optical interface 276, and a d-subminiature (D-sub) 278. The interface 270 may be included in e.g., the communication interface 170 shown in FIG. 1. Additionally or alternatively, the interface 270 may include a mobile high-definition link (MHL) interface, an SD card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for recording still images and videos, and may include one or more image sensors (e.g., front and back sensors), a lens, an image signal processor (ISP), or a flash such as an LED or xenon lamp.

The power manager module 295 may manage power of the electronic device 201 and the power manager module 295 may include a power management Integrated circuit (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device 201 may include one or more parts, and a name of the part may vary with a type of the electronic device 201. The electronic device 201 may include at least one of the aforementioned components, omit some of them, or include other additional component(s). Some of the components may be combined into an entity, but the entity may perform the same functions as the components may do.

Figure 3:
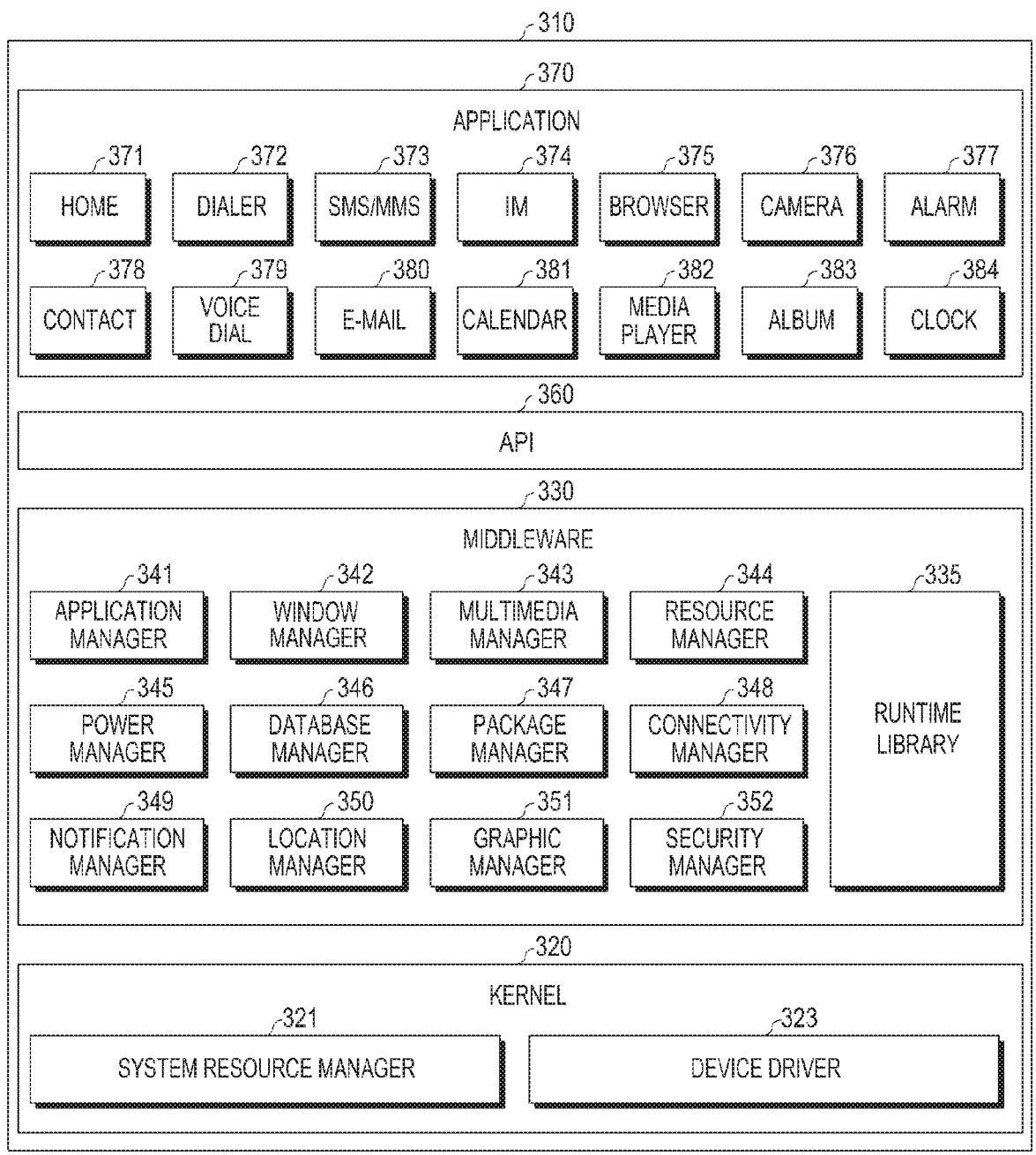
FIG. 3 is a block diagram illustrating a program module, according to an embodiment of the present disclosure.

FIG. 3 is a block diagram illustrating a program module, according to an embodiment of the present disclosure.

The program module 310 may include an OS controlling resources related to electronic device 101 (or the electronic device 201) and/or various applications (e.g., the application processor 147) driven on the OS. The OS may include, e.g., Android™, iOS™, Windows™, Symbian™, Tizen™, or Bada™.

The program 310 may include, e.g., a kernel 320, middleware 330, an application programming interface (API) 360, and/or an application 370. At least a part of the program module 310 may be preloaded on the electronic device or may be downloaded from the electronic devices 102 and 104 or the server 106.

The kernel 320 may include, e.g., a system resource manager 321 or a device driver 323. The system resource manager 321 may perform control, allocation, or recovery of system resources. The system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device 101 or provide functions jointly required by applications 370. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler in order to add a new function through a programming language while the application 370 is being executed. The runtime library 335 may perform input/output management, memory management, or operation on arithmetic functions.

The application manager 341 may manage the life cycle of at least one application of the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with a basic input/output system (BIOS) to manage battery or power and provide power information necessary for operating the electronic device 101. The database manager 346 may generate, search, or vary a database to be used in at least one of the applications 370. The package manager 347 may manage installation or update of an application that is distributed in the form of a package file.

The connectivity manager 348 may manage wireless connectivity, such as Wi-Fi or BT. The notification manager 349 may display or notify an event, such as a coming message, appointment, or proximity notification, of the user without interfering with the user. The location manager 350 may manage locational information on the electronic device 101. The graphic manager 351 may manage graphic effects to be offered to the user and their related user interface. The security manager 352 may provide various security functions necessary for system security or user authentication. When the electronic device 101 has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 may be a set of API programming functions and may have different configurations depending on operating systems. For example, in the case of Android™ or iOS™, one API set may be provided per platform, and in the case of Tizen™, two or more API sets may be offered per platform.

The application 370 includes one or more applications that may provide functions such as a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

The application 370 may include an application (hereinafter, "information exchanging application") supporting information exchange between the electronic device 101 and the electronic devices 102 and 104. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device 101 (e.g., the SMS/MMS application, email application, health-care application, or environmental information application) to the electronic devices 102 and 104. Further, the notification relay application may receive notification information from the electronic devices 102 and 104 may provide the received notification information to the user.

The device management application may perform at least some functions of the electronic device 102 or 104 communicating with the electronic device 101 (for example, turning on/off the electronic devices 102 and 104 (or some components of the electronic devices 102 and 104) or control of brightness (or resolution) of the display), and the device management application may manage (e.g., install, delete, or update) an application operating in the electronic devices 102 and 104 or a service (e.g., call service or message service) provided from the external electronic device.

The application 370 may include an application (e.g., a health-care application of a mobile medical device) designated according to an attribute of the electronic devices 102 and 104. The application 370 may include an application received from the server 106 or electronic devices 102 and 104. The application 370 may include a preloaded application or a third party application downloadable from a server. The names of the components of the program module 310 may be varied depending on the type of OS.

At least a part of the program module 310 may be implemented in software, firmware, hardware, or in a combination of two or more thereof. At least a part of the programming module 310 may be implemented (e.g., executed) by e.g., the processor 120. At least a part of the program module 310 may include e.g., a module, program, routine, set of instructions, process, or the like for performing one or more functions.

At least a part of the devices (e.g., modules or their functions) or methods (e.g., operations) described herein may be implemented as instructions stored in a non-transitory computer-readable storage medium e.g., in the form of a program module. The instructions, when executed by the processor 120, may enable the processor 120 to carry out a corresponding function. The non-transitory computer-readable storage medium may be the memory 130.

The non-transitory computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out embodiments of the present disclosure, and vice versa.

Modules or programming modules in accordance with the present disclosure may include at least one or more of the aforementioned components, omit some of them, or further include other additional components. Operations performed by modules, programming modules or other components may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments.

Figure 4A:
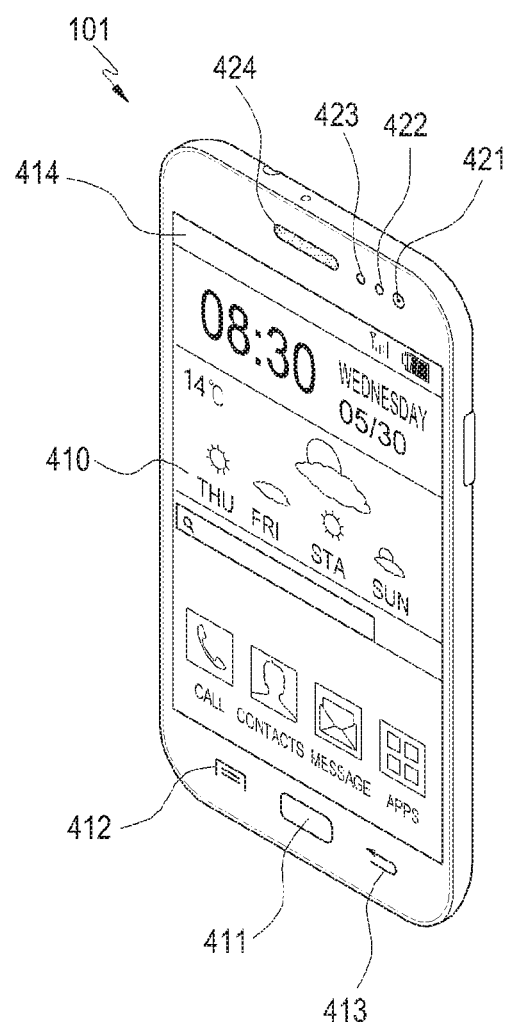
FIG. 4A is a front, perspective view illustrating an electronic device, according to an embodiment of the present disclosure.
Figure 4B:
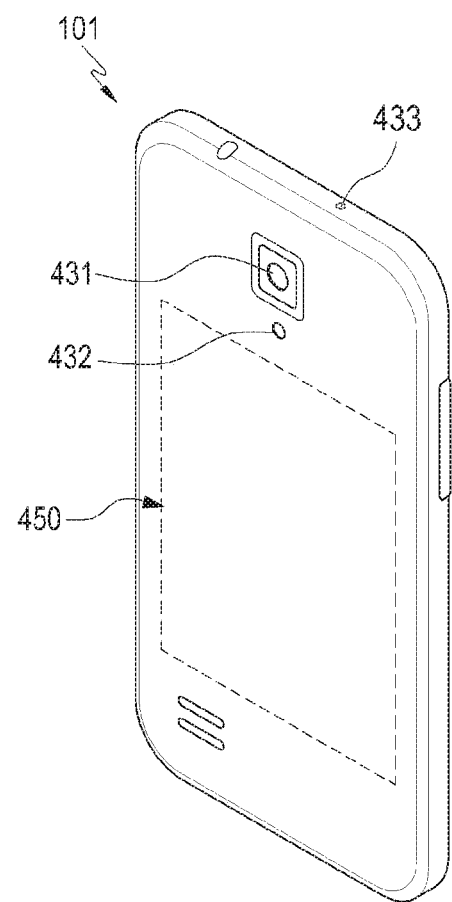
FIG. 4B is a rear, perspective view illustrating an electronic device, according to an embodiment of the present disclosure.

FIG. 4A is a front, perspective view illustrating the electronic device 101, according to an embodiment of the present disclosure, and FIG. 4B is a rear, perspective view illustrating the electronic device 101, according to an embodiment of the present disclosure. The electronic device 101 may be a smartphone or a wearable device.

Referring to FIG. 4A, a touch screen 410 may be provided at the center of a front surface of the electronic device 101, and the touch screen 410 may occupy most of the front surface of the electronic device 101. A main home screen is displayed on the touch screen 410, and the main home screen is displayed on the touch screen 410 when the electronic device 101 is powered on. When the electronic device 101 has several pages of different home screens, the main home screen may be the first one of the home screens. The home screen may include short-key icons, a main menu shifting key for running applications frequently used, a current time, and a weather. The main menu shifting key may display a menu on the touch screen 410. On the top of the touch screen 410 may be provided a status bar including battery recharge state, signal reception strength, or current time. A home button 411, a menu button 412, and a go-back button 413 may be provided on a lower portion of the touch screen 410.

The home button 411 may display the main home screen on the touch screen 410. For example, when the home button 411 is touched while the main home screen and other home screens (or menus) are in display on the touch screen 410, the main home screen may show up on the touch screen 410. When the home button 411 is touched while applications are running on the touch screen 410, the main home screen may be displayed on the touch screen 410. The home button 411 may be used to display applications recently used or a task manager on the touch screen 410. The menu button 412 may provide a connection menu that may be used on the touch screen 410. The connection menu may include an add widget menu, a change background menu, a search menu, an edit menu, and a setting menu. The go-back button 413 may display the screen displayed immediately before the screen currently in execution or may terminate the latest application used.

A first camera module 421, an illumination sensor 422, a proximity sensor 423, and/or a speaker 424 may be provided on an upper area of the front surface of the electronic device 101.

As shown in FIG. 4B, a second camera module 431, a flash 432 and/or a speaker 433 may be provided on the rear surface of the electronic device 101. When the electronic device 101 is configured with a detachable battery pack, a battery cover 450 (shown using phantom lines) may form the rear surface of the electronic device 101.

Figure 5:
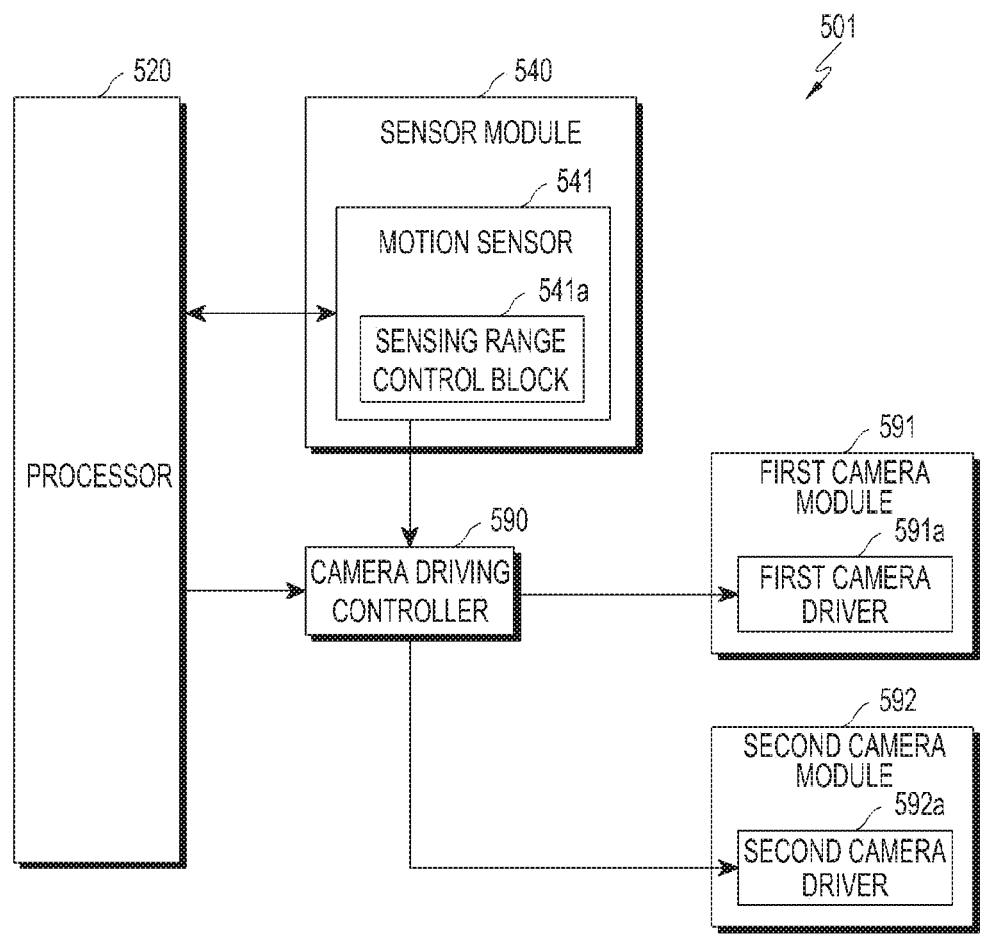
FIG. 5 is a block diagram illustrating a configuration of an electronic device, according to an embodiment of the present disclosure.

FIG. 5 is a block diagram illustrating a configuration of an electronic device 501, according to an embodiment of the present disclosure.

Referring to FIG. 5, the electronic device 501 includes a processor 520, a sensor module 540, an applied motion sensor 541 including a sensing range control block 541a, a camera driving controller 590, a first camera module 591 having a first camera driver 591a, and a second camera module 592 having a second camera driver 592a.

The processor 520 may include one or more of CPUs, an AP, and/or a CP. The processor 520 may process at least some information obtained from the sensor module 540, the motion sensor 541, the camera driving controller 590, the first camera module 591, and/or the second camera module 592 of the electronic device 501 and provide the processed information to a user in various manners. The processor 520 may control all of the components of the electronic device 501.

The sensor module 540 may include the gesture sensor 240A, the gyro sensor 240B, the air pressure sensor 240C, the magnetic sensor 240D, the acceleration sensor 240E, the grip sensor 240F, the proximity sensor 240G, the color sensor 240H (e.g., an RGB sensor), the bio sensor 240I, the temperature/humidity sensor 240J, the illumination sensor 240K, the UV sensor 240M, the olfactory sensor, the EMG sensor, the EEG sensor, the ECG sensor, the IR sensor, the iris sensor, and/or the fingerprint sensor. The sensor module 540 may further include a control circuit for controlling at least one or more of the sensors included in the sensing module.

The sensor module 540 may sense a motion of the electronic device 501 and using the motion sensor 541, which is capable of adjusting a range of a sensing motion. The motion sensor 541 may include the gyro sensor 240B to which the sensing range control block 541a can be applied to adjust the range of the sensing motion.

The motion sensor 541 may adjust the sensing range of the sensor through the sensing range control block 541a and may sense a motion of the electronic device 501 in a first sensing range and a motion of the first camera module 591 and/or the second camera module 592 in a second sensing range. Here, the first sensing range may be larger than the second sensing range. For example, the first sensing range may be a sensing range of the gyro sensor 240B to sense a motion of the electronic device 501 to determine motion recognition of the electronic device 501. Here, the first sensing range of the gyro sensor 240B may be when the full scale range (FSR) of the gyro sensor 240B is set to 1000 (degrees per second) dps to 2000 dps. The second sensing range may be a sensing range of the gyro sensor 240B to sense a motion in an image capturing mode of the first camera module 591 and/or second camera module 592 of the electronic device 501 to control the driving (e.g., optical image stabilization (OIS)) of the camera modules. Here, the second sensing range of the gyro sensor 240B may be when the FSR of the gyro sensor 240B is set to 100 dps to 150 dps.

The motion sensor 541 may sense, in a third sensing range, a motion of the electronic device 501 and a motion of the first camera module 591 or second camera module 592. The third sensing range may be the same as the first sensing range or between the first sensing range and the second sensing range. For example, the third sensing range may be a sensing range of the gyro sensor 240B for when the motion recognition of the electronic device 501 is required to be determined in an image capturing mode of the first camera module 591 or second camera module 592 of the electronic device 501. For example, the third sensing range may be a sensing range of the gyro sensor 240B when determination of the motion recognition of the electronic device 501 is required simultaneously upon camera capturing, such as in a panoramic capturing mode or wide selfie mode of image capturing modes of the camera module. In the third sensing range of the gyro sensor 240B, the FSR of the gyro sensor may be set to 1000 dps to 2000 dps to stop the control of optical image stabilization of the camera modules while performing only determination of motion recognition of the electronic device 501. Further, in the third sensing range of the gyro sensor 240B, the FSR of the gyro sensor may be set to 1000 dps to 150 dps which is a range between the first sensing range and the second sensing range to simultaneously perform the control of optical image stabilization of the camera module and determination of motion recognition of the electronic device 501.

The first camera module 591 or second camera module 592 may capture a still image or motion image and may include a front sensor and/or rear sensor, a lens, an ISP, or a flash (e.g., an LED or xenon lamp). The camera modules may be implemented as a camera capable of three-dimensional (3D) image capturing.

The first camera driver 591a and/or second camera driver 592a are capable of optical image stabilization for compensating for a movement of the user image-capturing the object by allowing for formation of the same image at a predetermined position even when a hand movement occurs as the lens or image sensor moves. The camera drivers 591a or 592a may include an optical image stabilizer (OIS).

The camera driving controller 590 may control the overall driving-related operation of the first camera module 591 and/or second camera module 592. The camera driving controller 590 may control the first camera driver 591a or second camera driver 592a provided in the first camera module 591 or second camera module 592 using sensing data obtained by the motion sensor 541.

The camera driving controller 590 may be configured or disposed outside the first camera module 591 or second camera module 592 and may be included in the processor 520. That is, instead of including the camera driving controller 590 as part of a component of the first camera module 591 or second camera module 592, the camera driving controller 590 can be included as a component of the processor 520. The camera driving controller 590 may select and control the camera driver 591a or 592a of the first camera module 591 or second camera module 592 under the control of the processor 520. The camera driving controller 590 may control the camera driver 591a or 592a of the first camera module 591 or second camera module 592 selected under the control of the processor 520 using the sensing data obtained by the motion sensor 541 to control the optical image stabilization of the corresponding one of the first camera module 591 or second camera module 592.

The processor 520 may determine whether to operate (or activate) the first camera module 591 or second camera module 592 included in the electronic device 501 and may control the motion sensor 541 to sense a motion of at least one of the electronic device 501 and the first camera module 591 or second camera module 592 depending on the determination The processor 520 may determine a motion of the electronic device 501 using the motion sensor 541 depending on the determination or may control the driving of at least one of the first camera module 591 or second camera module 592.

The processor 520 may set the sensing range of the motion sensor 541 to the first sensing range to obtain sensing data. The processor 520 may stop the operation of obtaining sensing data in the first sensing range of the motion sensor 541 and set the sensing range of the motion sensor 541 to the second sensing range to obtain sensing data. The processor 520 may control the driving of the first camera module 591 or second camera module 592 using the motion sensor 541 in the second sensing range.

While controlling the driving of the first camera module 591, when receiving a second input for driving the second camera module 592, the processor 520 may stop the operation of controlling the driving of the first camera module 591 using the motion sensor 541 and control the driving of the second camera module 592 using the motion sensor 541. For example, while maintaining the operation of obtaining sensing data in the second range of the motion sensor 541, the processor 520 may change the target for controlling the driving of the camera module from the first camera module 591 to the second camera module 592.

When receiving a third input for driving the first camera module 591 and the second camera module 592 in a dual mode, the processor 520 may select one of the first camera module 591 and the second camera module 592 as a camera module for dual-mode driving control in response to the third input. For example, the processor 520 may select the dual-mode driving control camera module as a camera module set for the dual mode. The processor 520 may select a camera module close to the object upon image capturing in the dual mode as the dual-mode driving control camera module. The processor 520 may select a camera module far from the object upon image capturing in the dual mode as the dual-mode driving control camera module. The processor 520 may select a camera module selected by the user upon image capturing in the dual mode as the dual-mode driving control camera module.

The processor 520 may set the sensing range of the motion sensor 541 to the third sensing range to obtain sensing data. The third sensing range may be the same as the first sensing range or between the first sensing range and the second sensing range. For example, the third sensing range may be a sensing range of the gyro sensor 240B for when the motion recognition of the electronic device 501 is required to be determined in an image capturing mode of the first camera module 591 or second camera module 592. For example, the third sensing range may be a sensing range of the gyro sensor 240B when determination of the motion recognition of the electronic device 501 is required simultaneously upon camera capturing, such as in a panoramic capturing mode or wide selfie mode of image capturing modes of the camera module. The processor 520 may set the third sensing range to the first sensing range to stop the control of the driving of the first camera module 591 and perform only determination of motion recognition of the electronic device 501. The processor 520 may set the third sensing range to a range between the first sensing range and the second sensing range to simultaneously perform the control of the driving of the first camera module 591 and the determination of motion recognition of the electronic device 501.

The processor 520 may determine whether to operate the first camera module 591 or second camera module 592 and control the driving of the camera module according to the direction in which the operating (or active) one of the at least one camera module 591 or 592 faces depending on the determination. For example, the processor 520 may control the driving of the first camera module 591 positioned on a first surface of the electronic device 501 according to a direction in which the first camera module 591 faces, e.g., a direction in which the first camera module 591 performs image capturing, using sensing data obtained by the motion sensor 541 or may control the driving of the second camera module 592 positioned on a second surface of the electronic device 501 according to a direction in which the second camera module 592 faces, e.g., a direction in which the second camera module 592 performs image capturing, using the sensing data.

The processor 520 may control the optical image stabilization of the first camera module 591 or second camera module 592 using sensing data obtained by the motion sensor 541.

Figure 6:
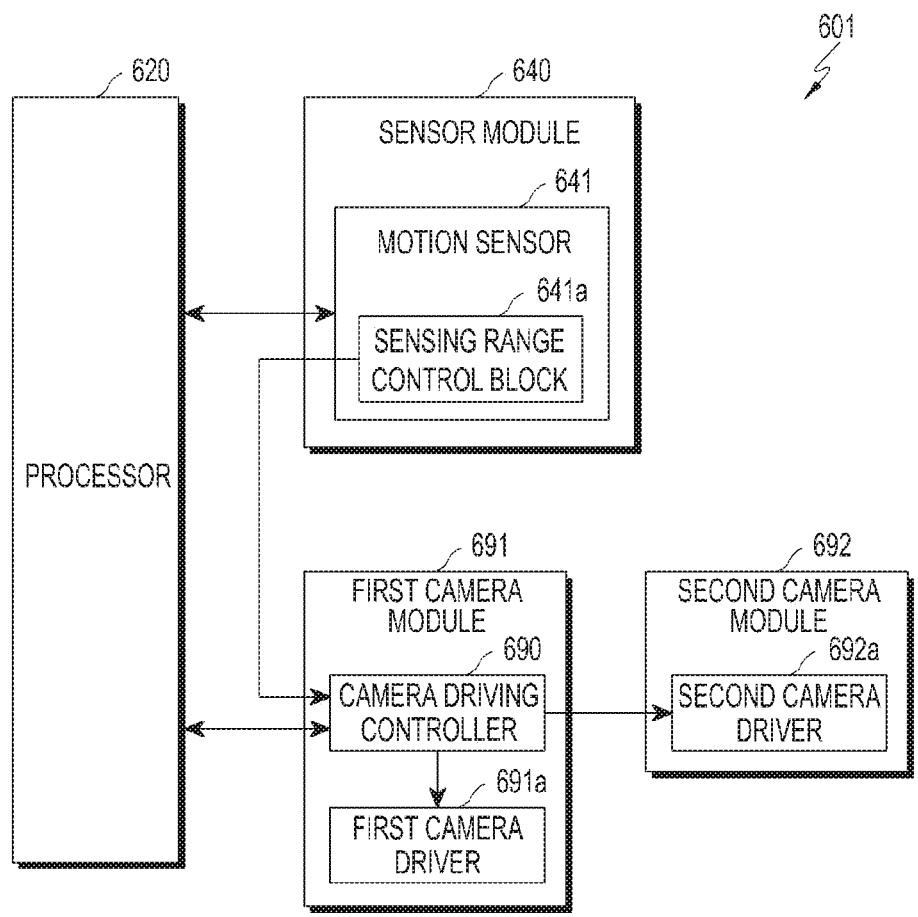
FIG. 6 is a block diagram illustrating a configuration of an electronic device, according to an embodiment of the present disclosure.

FIG. 6 is a block diagram illustrating a configuration of an electronic device 601, according to an embodiment of the present disclosure.

Referring to FIG. 6, the electronic device 601 includes a processor 620, a sensor module 640, a motion sensor 641 including a sensing range control block 641a applied, a first camera module 691 having a camera driving controller 690 and a first camera driver 691a, and a second camera module 692 having a second camera driver 692a.

The electronic device 601 may have substantially the same or similar functions as those of the electronic device 501 of FIG. 5, except that the camera driving controller 690 may be included in the first camera module 691.

The camera driving controller 690 may be configured outside the processor 620 and may be included in the first camera module 691 as shown in FIG. 6 or the second camera module 692. The camera driving controller 690 may control the first camera driver 691a of the first camera module 691 under the control of the processor 620. When the control of driving of the second camera module 692 is selected under the control of the processor 620, the camera driving controller 690 may control the second camera driver 692a of the second camera module 692. The camera driving controller 690 may control the camera driver 691a or 692a of the first camera module 691 or second camera module 692 selected under the control of the processor 620 using the sensing data obtained by the motion sensor 641 to control the optical image stabilization of the corresponding one of the first camera module 691 or second camera module 692.

Figure 7:
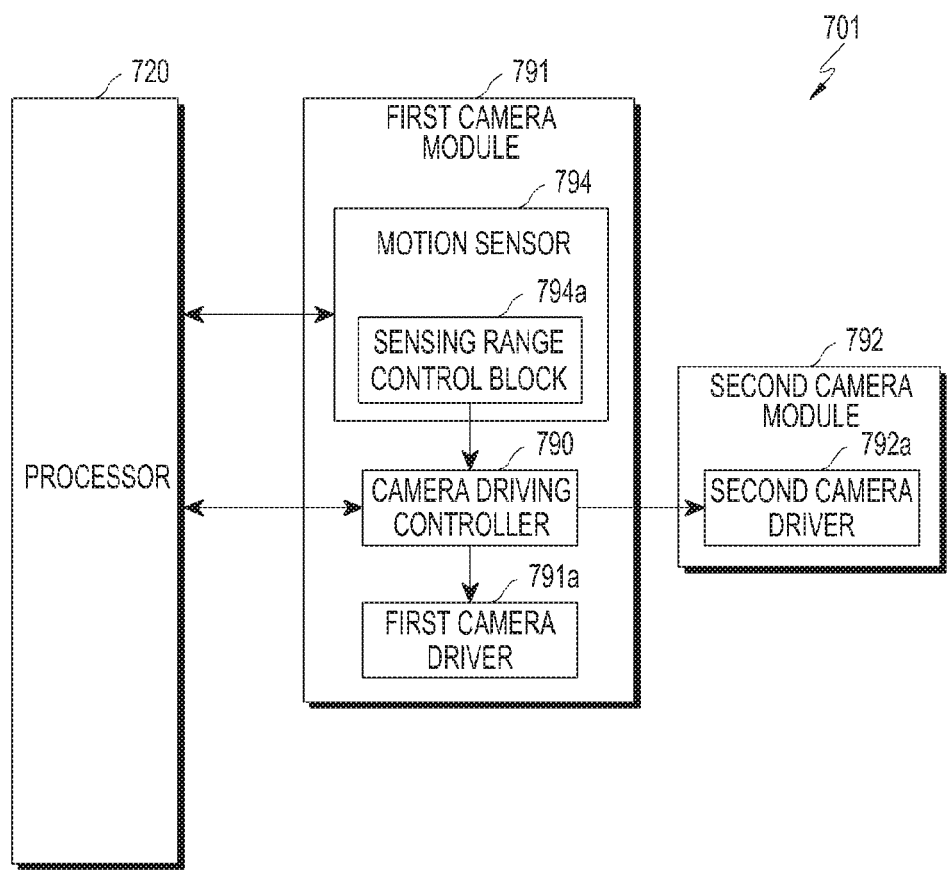
FIG. 7 is a block diagram illustrating a configuration of an electronic device, according to an embodiment of the present disclosure.

FIG. 7 is a block diagram illustrating a configuration of an electronic device 701, according to an embodiment of the present disclosure.

Referring to FIG. 7, the electronic device 701 includes a processor 720, a first camera module 791 including a motion sensor 794 having a sensing range control block 794a, a camera driving controller 790, and a first camera driver 791a, and a second camera module 792 having a second camera driver 792a.

The electronic device 701 may have substantially the same or similar functions as those of the electronic device 501 of FIG. 5 and the electronic device 601 of FIG. 6 except that the motion sensor 794 and the camera driving controller 790 may be included in the first camera module 791.

The motion sensor 794 may be configured outside the sensor module 540 or 640 and may be included in one of the first camera module 791 or second camera module 792. For example, the motion sensor 794 may be included in the first camera module 791 as shown in FIG. 7, or included in the second camera module 792. The motion sensor 794 may sense a motion of the electronic device 701 and may adjust a range of sensing the motion. The motion sensor 794 may include the gyro sensor 240B to which the sensing range control block 794a is applied to adjust the range of sensing motion. Further, the motion sensor 794 may adjust the sensing range of the gyro sensor 240B through the sensing range control block 794a and may sense a motion of the electronic device 701 in a first sensing range and a motion of the first camera module 791 or the second camera module 792 in a second sensing range. The motion sensor 794 may be included in the second camera module 792, but not in the first camera module 791.

Figure 8:
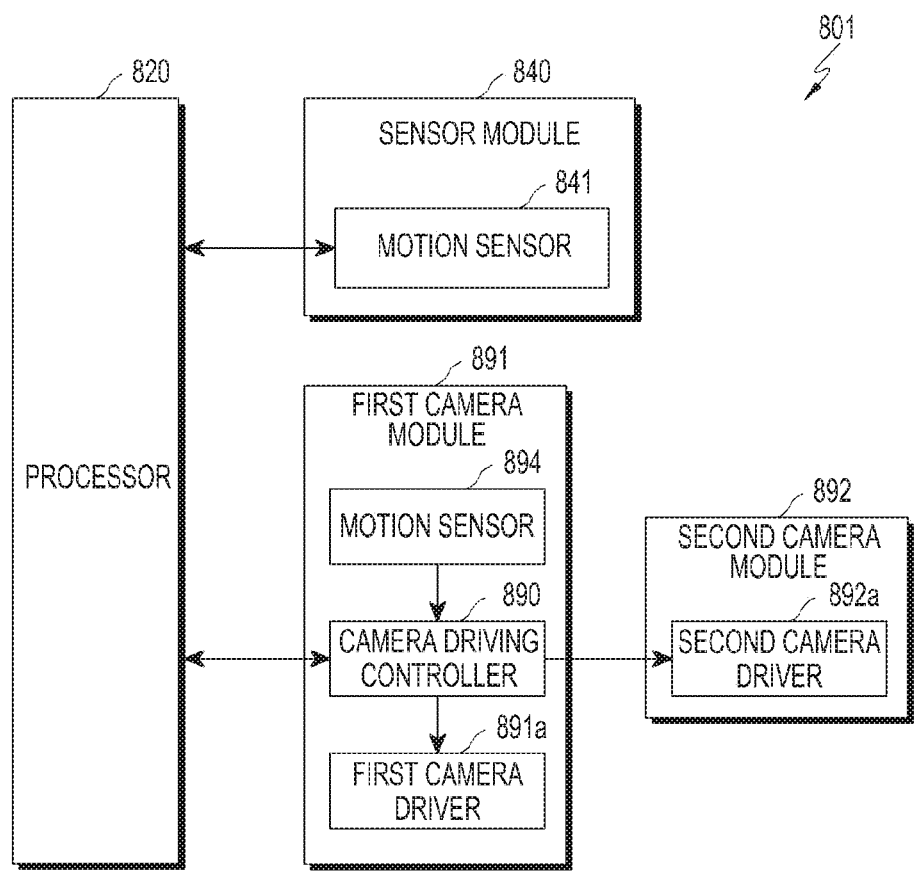
FIG. 8 is a block diagram illustrating a configuration of an electronic device, according to an embodiment of the present disclosure.

FIG. 8 is a block diagram illustrating a configuration of an electronic device 801, according to an embodiment of the present disclosure.

Referring to FIG. 8, the electronic device 801 includes a processor 820, a sensor module 840 having a first motion sensor 841, a first camera module 891 having a second motion sensor 894, a camera driving controller 890, and a first camera driver 891a, and a second camera module 892 having a second camera driver 892a.

The second motion sensor 894 and the camera driving controller 890 in the electronic device 801 may be included in the first camera module 891. The first motion sensor 841 having the same or similar functions to those of the second motion sensor 894 may be included in the sensor module 804. Except for the two configurations above, the electronic device 801 may have the same or similar functions to those of the electronic device 601 of FIG. 6 and the electronic device 701 of FIG. 7.

The second motion sensor 894 may be configured outside the sensor module 840. The second motion sensor 894 may have the same or similar functions to those of the first motion sensor 841 included in the sensor module 840 and may be included in one of the first camera module 891 or second camera module 892. For example, the second motion sensor 894 may be included in the first camera module 891 as shown in FIG. 8. The second motion sensor 891 may include the gyro sensor 240B whose sensing range has been set to be able to sense a motion of the first camera module 891 or second camera module 892. The first motion sensor 841 in the sensor module 840 may include the gyro sensor 240B whose sensing range is set to be able to a motion of the electronic device 801. For example, the first motion sensor 841 in the sensor module 840 may have an FSR set to 1000 dps to 2000 dps as a sensing range for determining motion recognition of the electronic device 801. The second motion sensor 894 in the first camera module 891 may have an FSR set to 100 dps to 150 dps as a sensing range to sense a motion in an image capturing mode of the first camera module 891 or second camera module 892 to operate the optical image stabilization of a respective one of the camera modules.

The second motion sensor 894 may be included in the second camera module 892, but not in the first camera module 891. Further, the second motion sensor 894 may be use to control the driving of the second camera module 892 under the control of the camera driving controller 890.

Figure 9:
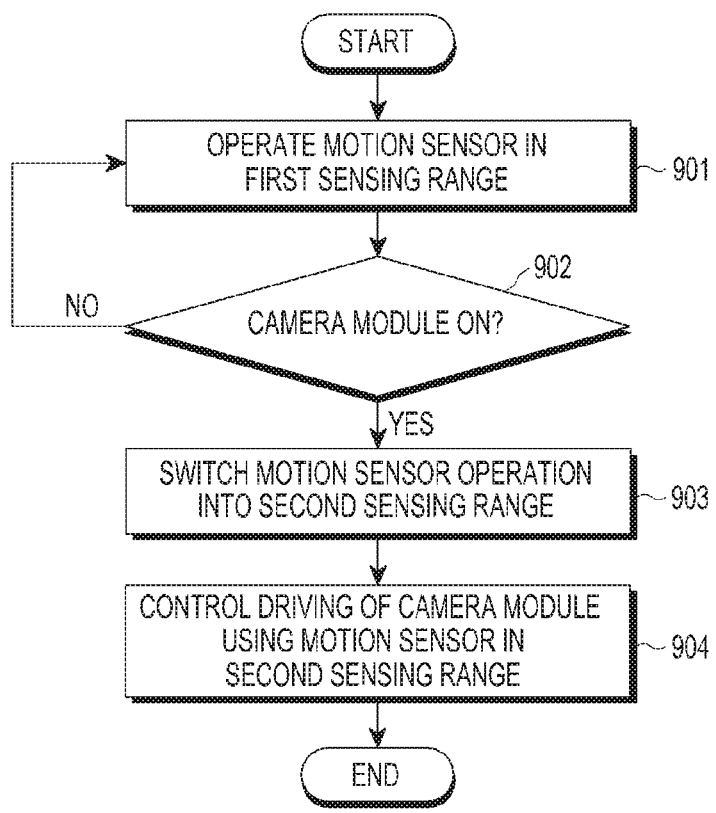
FIG. 9 is a flowchart of a method for controlling an electronic device, according to an embodiment of the present disclosure.

FIG. 9 is a flowchart illustrating a method for controlling one of the aforementioned electronic devices, according to an embodiment of the present disclosure.

The electronic device in step 901 may determine a motion of the electronic device using a motion sensor (e.g., the motion sensor 841). The electronic device may control the motion sensor in a first sensing range to sense the motion of the electronic device. For example, the first sensing range of the motion sensor may be a sensing range of the gyro sensor 240B to sense a motion of the electronic device to determine motion recognition of the electronic device. For example, the first sensing range of the gyro sensor 240B may be one when the FSR of the gyro sensor 240B is set to 1000 dps to 2000 dps.

The electronic device in step 902 may determine whether at least one camera module (e.g., a first camera module or a second camera module) included in the electronic device is operational or activated.

When a one camera module is activated or operating, the electronic device in step 903 may switch the operation of the motion sensor into a second sensing range in order to control the driving of the camera module. For example, the second sensing range of the motion sensor may be a sensing range of the gyro sensor 240B to sense a motion in an image capturing mode of the camera module to control optical image stabilization of the camera module. For example, the second sensing range of the gyro sensor may be one when the FSR of the gyro sensor is set to 100 dps to 150 dps.

The electronic device in step 904 may control the driving of the operating camera module using the motion sensor in the second sensing range. For example, the electronic device may control optical image stabilization of the camera module using sensing data obtained by the motion sensor.

Figure 10:
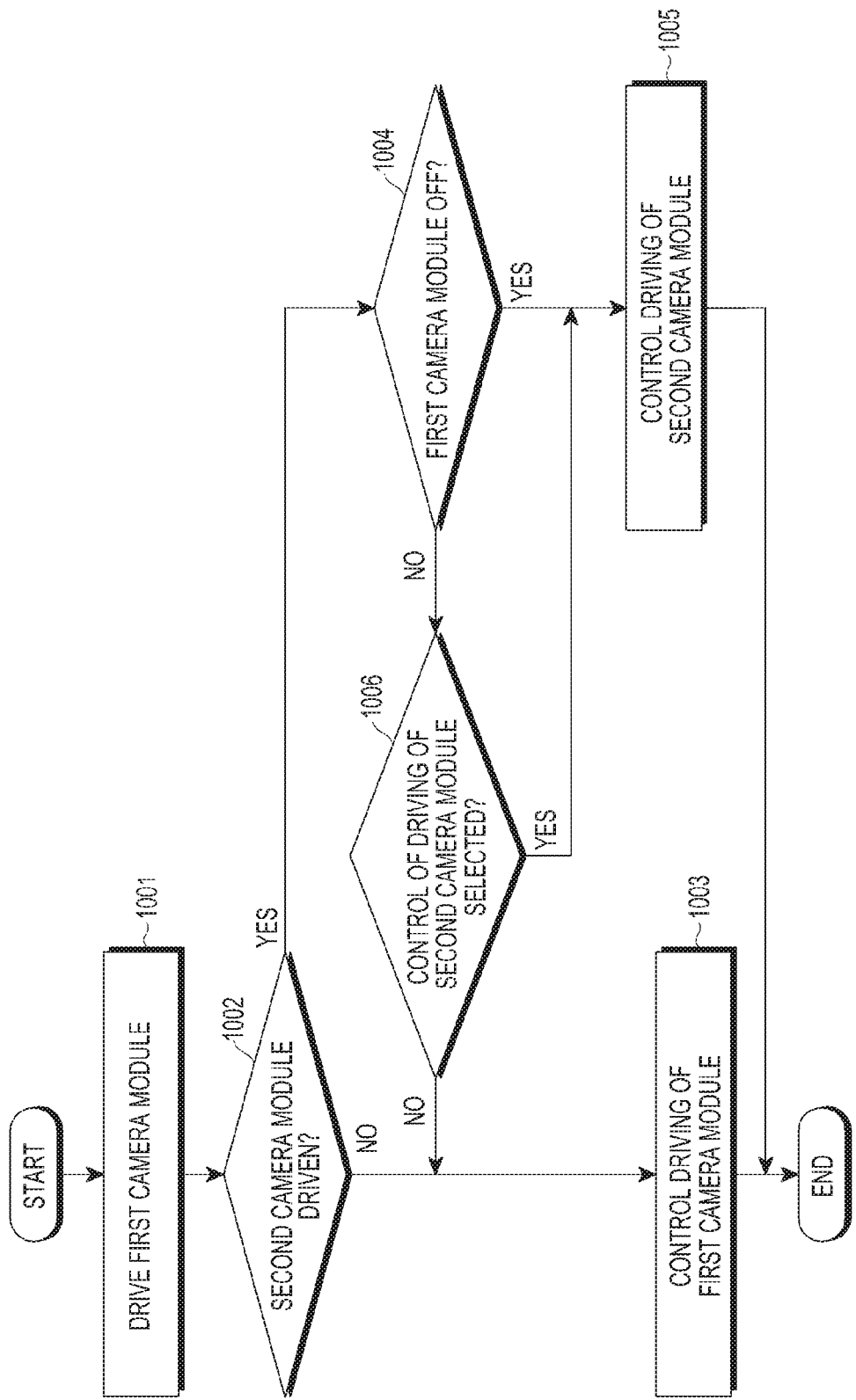
FIG. 10 is a flowchart of a method for controlling an electronic device, according to an embodiment of the present disclosure.

FIG. 10 is a flowchart illustrating a method for controlling one of the aforementioned electronic devices, according to an embodiment of the present disclosure.

In accordance with the method of FIG. 10, the camera driving controller 590 in the electronic device 501 may be provided outside the first camera module 591 or second camera module 592 to control one of the these camera modules. Alternatively, the camera driving controllers 690, 790, or 890 in the electronic devices 601, 701, or 801, respectively, may be included inside the first camera modules 691, 791, or 891 or second camera module 692, 792, or 892 to control one of these corresponding camera modules.

The electronic device in step 1001 may drive the first camera module included in the electronic device.

The electronic device in step 1002 may determine whether the second camera module in the electronic device is active or operating. When the second camera module is not driven, the electronic device in step 1003 may control the driving of the first camera module using the motion sensor in the second sensing range.

When the second camera module is driven, the electronic device in step 1004 may determine whether to stop the control of driving of the first camera module. When the control of driving of the first camera module is stopped, the electronic device in step 1005 may control the driving of the second camera module using the motion sensor in the second sensing range.

When the control of driving of the first camera module is not stopped, the electronic device in step 1006 may select the first camera module and/or the second camera module to be driven, unless the second camera module is selected as the camera module to be driven, goes to step 1003 to control the driving of the first camera module When the second camera module is selected as the camera module to be driven, the electronic device may go to step 1005 to control the driving of the second camera module.

Figure 11:
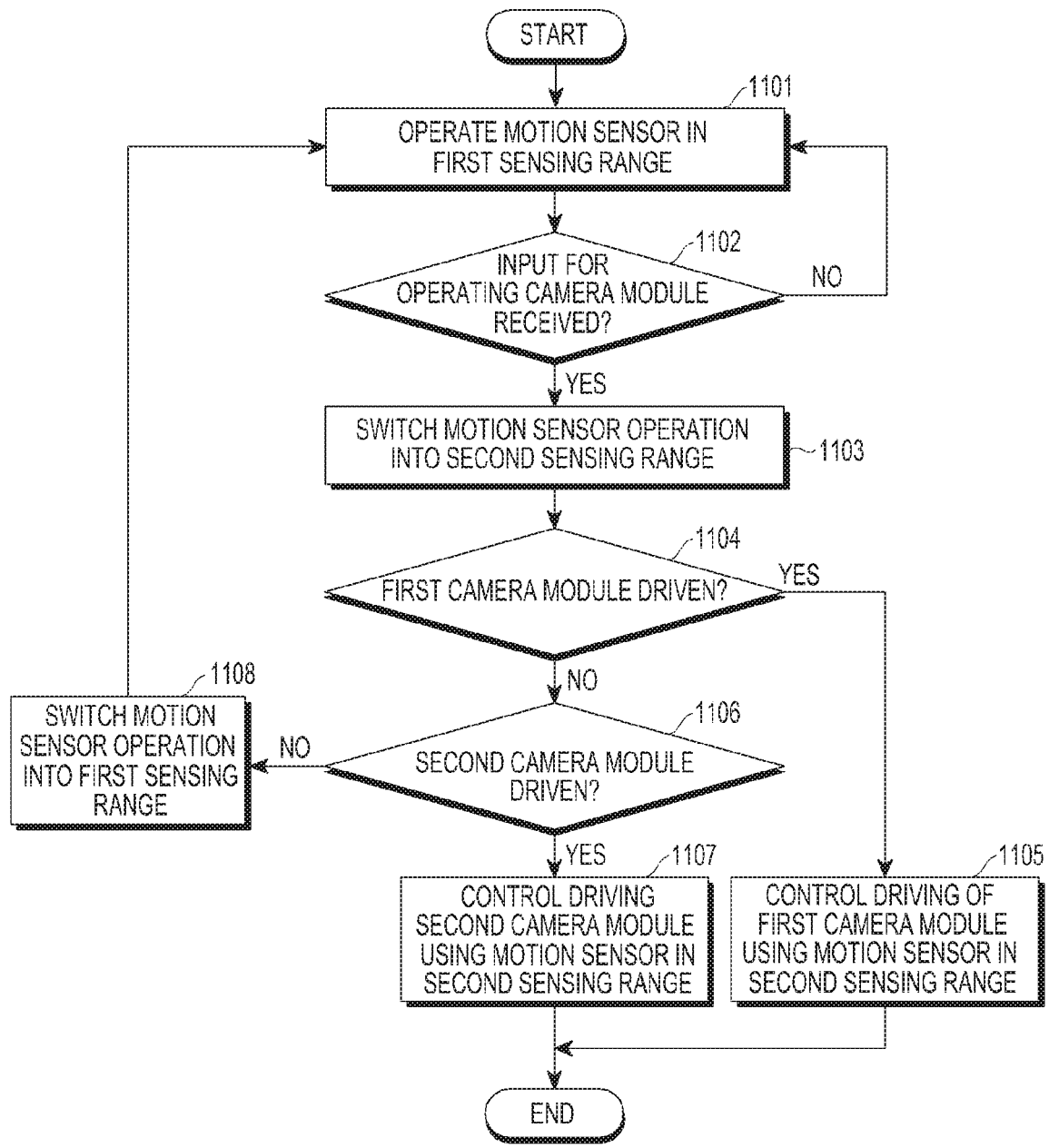
FIG. 11 is a flowchart of a method for controlling an electronic device, according to an embodiment of the present disclosure.

FIG. 11 is a flowchart illustrating a method for controlling one of the aforementioned electronic devices, according to an embodiment of the present disclosure.

The electronic device in step 1101 may determine a motion of the electronic device using a motion sensor. The electronic device may control the motion sensor in a first sensing range to sense the motion of the electronic device.

The electronic device in step 1102 may receive an input for operating at least one camera module included in the electronic device. For example, the electronic device may receive an input for operating the camera module according to a button input enabling the camera module to be powered. The electronic device may receive an input for operating the camera module according to an execution of an application enabling the camera module to operate to provide a camera function. For example, when the application enabling the camera module to operate to provide a camera function is initially set for the first camera module, the electronic device may receive a first input for driving the first camera module that is generated as the application runs. When the application enabling the camera module to operate to provide a camera function is initially set for the second camera module, the electronic device may receive a second input for driving the second camera module that is generated as the application runs. The electronic device may receive an input for driving a camera module other than a camera module operating according to the user's selection while one of the first camera module or second camera module operates.

When receiving an input for operating at least one of the camera modules, the electronic device in step 1103 may switch the operation of the motion sensor into a second sensing range in order to control the driving of a selected camera module.

The electronic device in step 1104 may determine whether the first camera module is driven by receiving an input for driving the first camera module. When the first camera module is being driven, the electronic device may go to step 1105, and when the first camera module is not being driven, the electronic device may go to step 1106.

When the first camera module is being driven, the electronic device in step 1105 may control the driving of the first camera module using the motion sensor in the second sensing range.

Unless the first camera module is being driven, the electronic device in step 1106 may determine whether the second camera module is driven by receiving an input for driving the second camera module. When the second camera module is being driven, the electronic device may go to step 1107 to control the driving of the second camera module using the motion sensor in the second sensing range. Unless the second camera module is being driven, the electronic device may go to step 1108 to switch the sensing range of the motion sensor from the second sensing range to the first sensing range. For example, when the first camera module and second camera module are not driven in steps 1104 and 1106, the electronic device in step 1108 may switch the operation of the motion sensor into the first sensing range to sense a motion of the electronic device. For example, upon failing to receive the user's selection for a predetermined time while an application runs which operates the camera module to provide a camera function, the electronic device may switch the application into a power saving mode. Thus, the electronic device may switch the operation of the motion sensor from the second sensing range to the first sensing range.

Step 1103 may be performed after steps 1104 and 1106 have been performed. For example, after identifying the driving of one of the first camera module and the second camera module, the electronic device in step 1103 may switch the operation of the motion sensor from the first sensing range for sensing a motion of the electronic device to the second sensing range for controlling the driving of the camera module.

Figure 12:
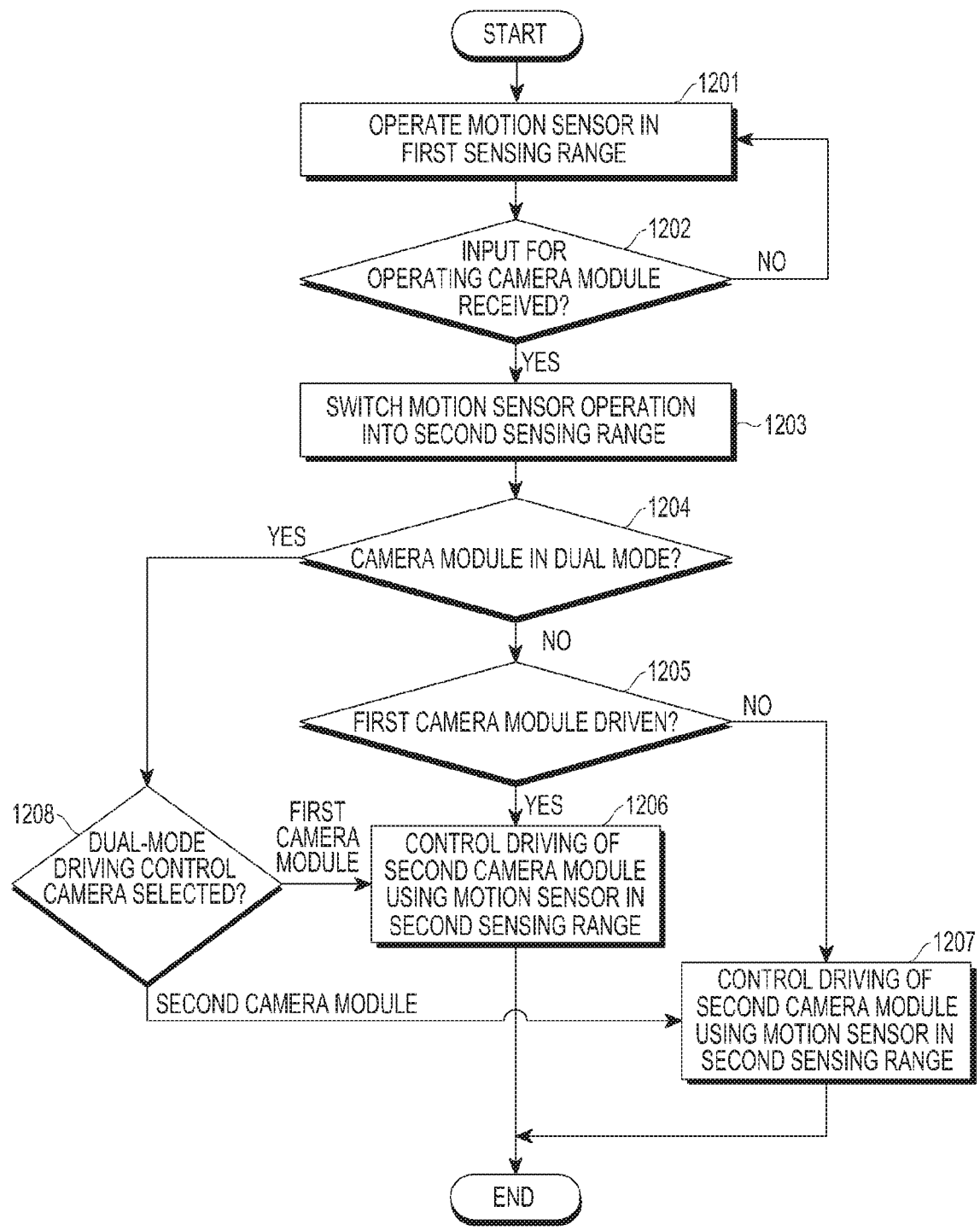
FIG. 12 is a flowchart of a method for controlling an electronic device, according to an embodiment of the present disclosure.

FIG. 12 is a flowchart illustrating a method for controlling one of the aforementioned electronic devices, according to an embodiment of the present disclosure.

The electronic device in step 1201 may determine a motion of the electronic device using a motion sensor. The electronic device may control the motion sensor in a first sensing range to sense the motion of the electronic device.

The electronic device in step 1202 may receive an input for operating at least one camera module included in the electronic device. For example, the electronic device may receive an input for operating the camera module according to a button input enabling the camera module to be powered. The electronic device may receive an input for operating the camera module according to the execution of an application enabling the camera module to operate to provide a camera function.

When receiving an input for operating at least one of the at least one camera module, the electronic device in step 1203 may switch the operation of the motion sensor into a second sensing range in order to control the driving of the camera module.

The electronic device may determine whether the camera modules are driven in the dual mode in step 1204. Unless the camera modules are being driven in the dual mode, the electronic device may go to step 1205. When the camera modules are being driven in the dual mode, the electronic device may go to step 1208.

Unless the camera modules are being driven in the dual mode, the electronic device in step 1205 may determine whether the first camera module is being driven. When the first camera module is being driven, the electronic device in step 1206 may control the driving of the first camera module using the motion sensor in the second sensing range. Unless the first camera module is being driven, the electronic device in step 1207 may control the driving of the second camera module using the motion sensor in the second sensing range.

When the camera modules are being driven in the dual mode, the electronic device in step 1208 may select one of the first camera module and the second camera module as a dual-mode driving control camera module. When the first camera module is selected as the dual-mode driving control camera module in step 1208, the electronic device may go to step 1206 to control the driving of the first camera module. When the second camera module is selected as the dual-mode driving control camera module in step 1208, the electronic device may go to step 1207 to control the driving of the second camera module. For example, the electronic device may select the dual-mode driving control camera module as a camera module set for the dual mode. The electronic device may select a camera module close to the object upon image capturing in the dual mode as the dual-mode driving control camera module. The electronic device may select a camera module far from the object upon image capturing in the dual mode as the dual-mode driving control camera module. The electronic device may select a camera module selected by the user upon image capturing in the dual mode as the dual-mode driving control camera module.

Figure 13:
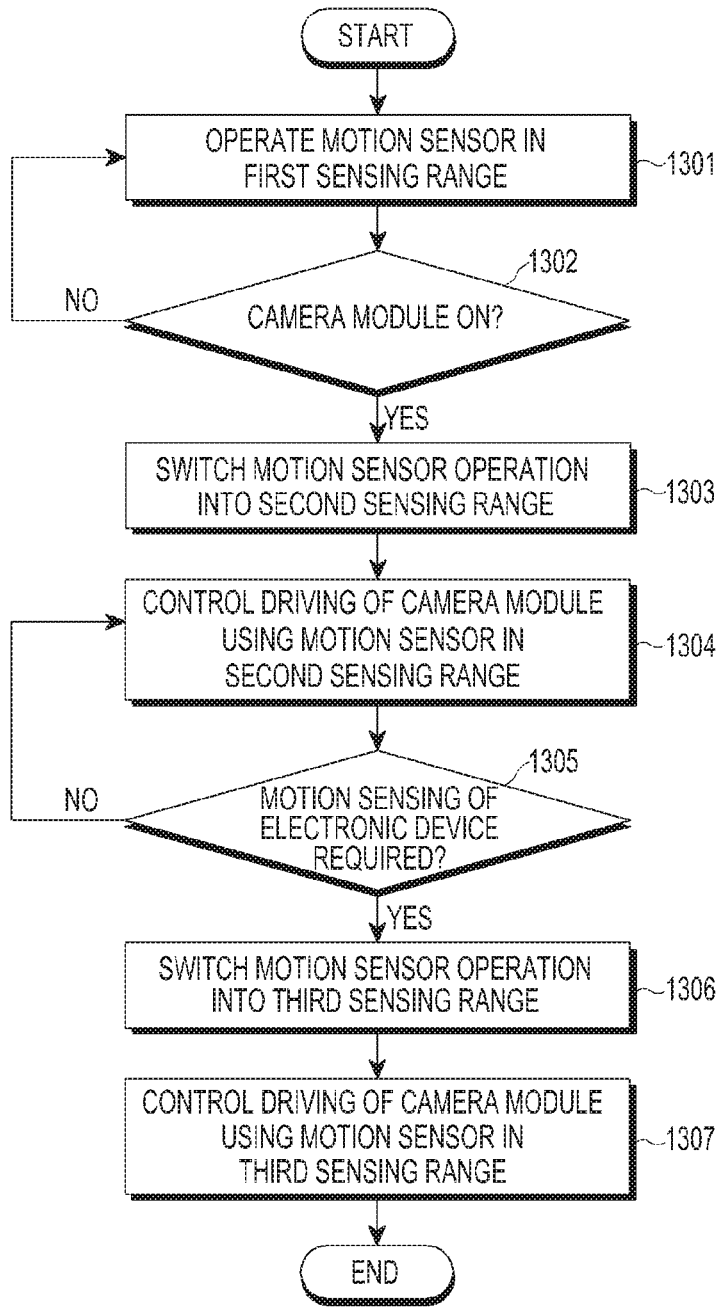
FIG. 13 is a flowchart of a method for controlling an electronic device, according to an embodiment of the present disclosure.

FIG. 13 is a flowchart illustrating a method for controlling one of the aforementioned electronic devices, according to an embodiment of the present disclosure.

The electronic device in step 1301 may determine a motion of the electronic device using a motion sensor. The electronic device may control the motion sensor in a first sensing range to sense the motion of the electronic device.

The electronic device in step 1302 may determine whether at least one camera module included in the electronic device is operating or activated.

When at least one of the at least one camera module is operating, the electronic device in step 1303 may switch the operation of the motion sensor into a second sensing range in order to control the driving of the operating camera module.

The electronic device in step 1304 may control the driving of the operating camera module o using the motion sensor in the second sensing range. For example, the electronic device may control optical image stabilization of the camera module using sensing data obtained by the motion sensor.

The electronic device in step 1305 may determine whether the motion sensing of the electronic device is required by receiving an input for determining a motion of the electronic device in a state where the at least one camera module is operating (e.g., the motion sensor obtains sensing data in the second sensing range). For example, when receiving an input for a panoramic image capturing mode or wide selfie mode of image capturing modes of the camera module, the electronic device may determine that the motion recognition of the electronic device is required simultaneously with camera capturing.

When the motion sensing of the electronic device is required, the electronic device in step 1306 may switch the operation of the motion sensor into the third sensing range to control the driving of the camera module and sense a motion of the electronic device. For example, the third sensing range of the motion sensor may be the same as the first sensing range or between the first sensing range and the second sensing range. For example, the third sensing range may be a sensing range of the gyro sensor 240B for when the motion recognition of the electronic device is required to be determined in an image capturing mode of at least one camera module included in the electronic device. For example, the third sensing range may be a sensing range of the gyro sensor 240B when determination of the motion recognition of the electronic device is required simultaneously upon camera capturing, such as in a panoramic capturing mode or wide selfie mode of image capturing modes of the camera module.

The electronic device in step 1307 may control the driving of the operating camera module using the motion sensor in the third sensing range. For example, when the third sensing range is set to the first sensing range, the electronic device may maintain the image capturing mode of the camera module but stop the control of driving of the camera module.

For example, in the panoramic image capturing mode or wide selfie mode of image capturing modes of the camera module, only determination of the motion recognition of the electronic device may be performed while stopping the control of the optical image stabilization of the camera module. When the third sensing range is set to a range between the first sensing range and the second sensing range, the electronic device may simultaneously perform the control of driving of the camera module and the determination of motion recognition of the electronic device. For example, in the panoramic image capturing mode or wide selfie mode of image capturing modes of the camera module, the electronic device may control the optical image stabilization of the camera module while determining the motion recognition of the electronic device.

Figure 14:
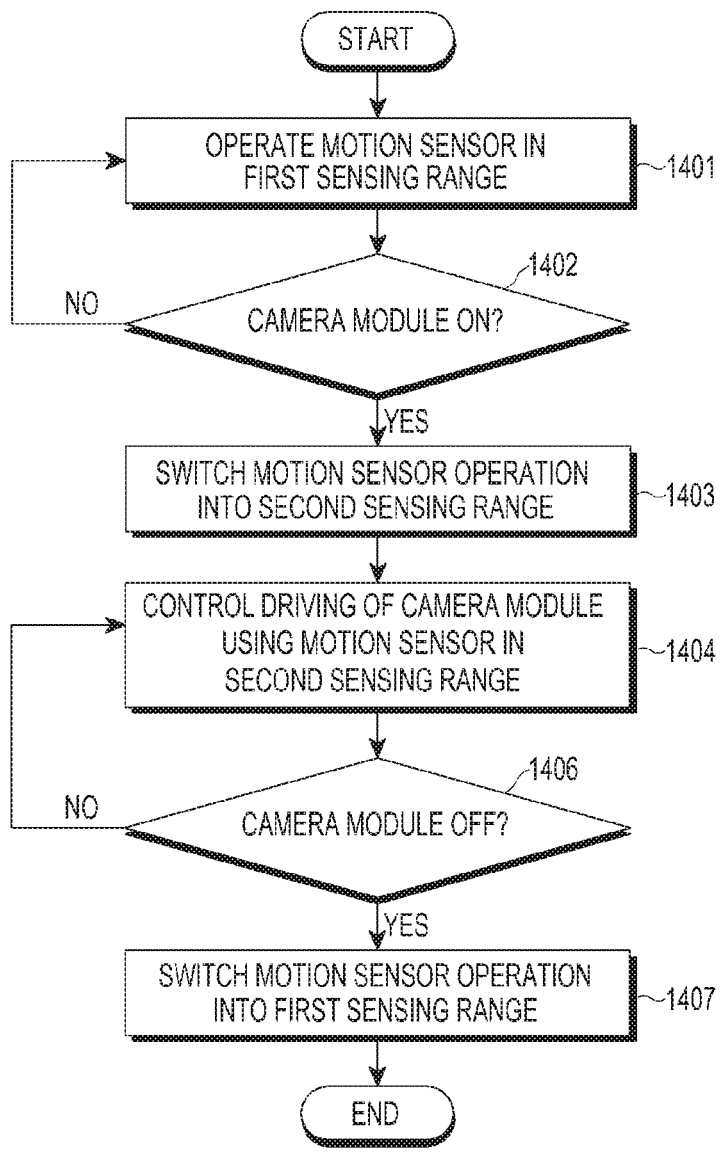
FIG. 14 is a flowchart of a method for controlling an electronic device, according to an embodiment of the present disclosure.

FIG. 14 is a flowchart illustrating a method for controlling one of the aforementioned electronic devices, according to an embodiment of the present disclosure.

The electronic device in step 1401 may determine a motion of the electronic device using a motion sensor. The electronic device may control the motion sensor in a first sensing range to sense the motion of the electronic device.

The electronic device in step 1402 may determine whether at least one camera module included in the electronic device is operating.

When at least one of the at least one camera module is operating, the electronic device in step 1403 may switch the operation of the motion sensor into a second sensing range in order to control the driving of the camera module.

The electronic device in step 1404 may control the driving of the operating camera module of the at least one camera module using the motion sensor in the second sensing range. For example, the electronic device may control optical image stabilization of the camera module using sensing data obtained by the motion sensor.

The electronic device in step 1406 may determine whether the camera module stops operating. When the operation of the camera module is maintained, the electronic device may go to step 1404 to maintain the control of driving of the camera module.

When the operation of the camera module stops, the electronic device in step 1407 may switch the operation or sensing range of the motion sensor from the second sensing range to the first sensing range in order to sense a motion of the electronic device.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A portable communication device, comprising:
a motion sensor;
at least two camera modules including a first camera module and a second camera module; and
at least one processor electrically connected to the first camera module and the second camera module, and electrically connected to the motion sensor;
wherein the at least one processor is configured to:
receive, from the motion sensor, a first signal corresponding to a first sensing range of the motion sensor via a first path, the first signal being generated by the motion sensor as the motion sensor is set to operate based on the first sensing range;

identify whether at least one camera module of the first camera module and the second camera module is activated;

based on identifying that the at least one camera module is activated, receive, from the motion sensor, a second signal corresponding to a second sensing range of the motion sensor via a second path, the second signal being generated by the motion sensor as the motion sensor is set to operate based on the second sensing range; and perform a function related with the at least one camera module based on the second signal received from the motion sensor via the second path.

2. The portable communication device of claim 1, wherein the first sensing range and the second sensing range are exclusive to each other.

3. The portable communication device of claim 1, wherein the motion sensor is configured to:

generate the first signal by sensing a motion related to the portable communication device within the first sensing range, and output the first signal via the first path.

4. The portable communication device of claim 1, wherein the motion sensor is configured to:

generate the second signal by sensing a motion related to the first camera module or the second camera module and the portable communication device within the second sensing range, and output the second signal via the second path.

5. The portable communication device of claim 1, wherein the motion sensor is included in one of the first camera module and second camera module.

6. The portable communication device of claim 1, wherein the motion sensor is included in a housing of the portable communication device and outside of the first camera module and the second camera modules.

7. The portable communication device of claim 1, wherein the first sensing range is greater than the second sensing range, and wherein the at least one processor is configured to:

identify the first signal as a motion of the portable communication device, and the second signal as a motion of a corresponding one of the first camera module and the second camera module, respectively.

8. The portable communication device of claim 1, wherein the first sensing range is a selected one between 1000 degree per second (dps) and 2000 dps.

9. The portable communication device of claim 1, wherein the second sensing range is a selected one between 100 dps and 150 dps.

10. The portable communication device of claim 1, wherein the at least one processor is further configured to:

perform, as the function, an optical image stabilization (OIS) of the at least one camera module.

11. The portable communication device of claim 10, wherein the at least one processor is further configured to receive a first input for driving the first camera module, and in response to the first input, and perform, as at least part of the function, the OIS related to the first camera module using the second signal received from the motion sensor via the second path.

12. The portable communication device of claim 10, wherein the first camera module includes a first camera driver, and the second camera module includes a second camera driver, and wherein the at least one processor is further configured to:

perform the OIS of the at least one of the first camera module or the second camera module by controlling a corresponding one of the first camera driver and the second camera driver.

13. A method of operating a portable communication device including a motion sensor, a first camera module, and a second camera module, the method comprising:

receiving, from the motion sensor a first signal corresponding to a first sensing range of the motion sensor via a first path, the first signal being generated by the motion sensor as the motion sensor is set to operate based on the first sensing range;

identifying whether at least one camera module of the first camera module and the second camera module is activated;

based on identifying that the at least one camera module is activated, receiving, from the motion sensor, a second signal corresponding to a second sensing range of the motion sensor via a second path, the second signal being generated by the motion sensor as the motion sensor is set to operate based on the second sensing range; and performing a function related to the at least one camera based on the second signal received from the motion sensor via the second path.

14. The method of claim 13, further comprising:

identifying a motion of the portable communication device based on the first signal received from the motion sensor via the first path, and based on the identifying the motion, executing an application based at least in part on the motion of the portable communication device.

15. The method of claim 13, wherein the first sensing range is greater than the second sensing range.

16. The method of claim 13, wherein receiving of the first signal includes identifying the first signal as a motion of the portable communication device.

17. The method of claim 13, wherein receiving of the second signal includes identifying the second signal as a motion of a corresponding one of the first camera module and the second camera module.

18. The method of claim 13, wherein the performing of the function includes:

performing an optical image stabilization (OIS) of the at least one of camera module.

19. The method of claim 18, further comprising:

receiving a first input for driving the first camera module, and in response to the first input, performing, as at least part of the function, the OIS related to the first camera module using the second signal received from the motion sensor via the second path.

20. The method of claim 18, wherein the first camera module includes a first camera driver, and the second camera module includes a second camera driver, and wherein performing of the OIS includes controlling a corresponding one of the first camera driver and the second camera driver.

* * * * *